US009928482B2

(12) United States Patent
Prager et al.

(10) Patent No.: US 9,928,482 B2
(45) Date of Patent: Mar. 27, 2018

(54) INTEGRATING PRIVATE METADATA INTO A COLLABORATIVE ENVIRONMENT

(75) Inventors: Scott H. Prager, Stratham, NH (US); Sami M. Shalabi, Winchester, MA (US)

(73) Assignee: International Business Machines Corporation, Armonk, NY (US)

( * ) Notice: Subject to any disclaimer, the term of this patent is extended or adjusted under 35 U.S.C. 154(b) by 2439 days.

(21) Appl. No.: 11/614,184

(22) Filed: Dec. 21, 2006

(65) Prior Publication Data

US 2008/0155430 A1 Jun. 26, 2008

(51) Int. Cl.
G06Q 10/10 (2012.01)
H04L 12/58 (2006.01)
H04L 12/18 (2006.01)

(52) U.S. Cl.
CPC .......... G06Q 10/10 (2013.01); *H04L 12/1813* (2013.01); *H04L 12/1822* (2013.01); *H04L 51/00* (2013.01)

(58) Field of Classification Search
CPC ....... G06F 3/00; G06F 3/048; H04L 12/1822; H04L 12/1813; H04L 12/581; G06Q 10/10; G06Q 10/101
USPC .................................................. 715/743, 751
See application file for complete search history.

(56) References Cited

U.S. PATENT DOCUMENTS

| 5,107,443 | A | * | 4/1992 | Smith et al. | 715/751 |
| 5,793,365 | A | * | 8/1998 | Tang et al. | 715/758 |
| 5,859,974 | A | * | 1/1999 | McArdle et al. | 709/204 |
| 5,872,924 | A | * | 2/1999 | Nakayama et al. | 709/205 |
| 5,880,731 | A | * | 3/1999 | Liles et al. | 715/758 |
| 6,219,045 | B1 | * | 4/2001 | Leahy et al. | 715/757 |
| 6,629,100 | B2 | | 9/2003 | Morris et al. | |
| 6,772,195 | B1 | * | 8/2004 | Hatlelid et al. | 709/204 |
| 6,784,901 | B1 | * | 8/2004 | Harvey et al. | 715/757 |
| 6,931,597 | B1 | * | 8/2005 | Prakash | 715/741 |
| 7,047,411 | B1 | * | 5/2006 | DeMello et al. | 713/176 |
| 7,124,372 | B2 | * | 10/2006 | Brin | 715/751 |
| 7,328,258 | B2 | * | 2/2008 | Koide et al. | 709/223 |
| 7,516,411 | B2 | * | 4/2009 | Beaton et al. | 715/753 |

(Continued)

OTHER PUBLICATIONS

Microsoft Press, Microsoft Computer Dictionary, Fifth Edition (2002).*

*Primary Examiner* — Doon Chow
*Assistant Examiner* — Le Nguyen
(74) *Attorney, Agent, or Firm* — Steven M. Greenberg, Esq.; CRGO Law

(57) ABSTRACT

Embodiments of the present invention address deficiencies of the art in respect to meta-data management for an activity thread in an activity-centric collaborative environment, and provide a novel and non-obvious method, system and computer program product for private metadata integration. In one embodiment of the invention, a private meta-data integration method can be provided for an activity-centric collaborative environment. The method can include selecting an activity thread for display to a collaborator in an activity map of the activity-centric collaborative environment, and identifying the collaborator. For meta-data instances associated with corresponding activity objects in the activity thread, the meta-data instances can be excluded that have been marked private by a creator other than the identified collaborator.

17 Claims, 2 Drawing Sheets

(56) References Cited

U.S. PATENT DOCUMENTS

| | | | |
|---|---|---|---|
| 7,640,506 B2* | 12/2009 | Pratley et al. | 715/751 |
| 2002/0138582 A1* | 9/2002 | Chandra et al. | 709/206 |
| 2003/0023677 A1* | 1/2003 | Morison Zuill et al. | 709/203 |
| 2003/0055983 A1* | 3/2003 | Callegari | 709/227 |
| 2003/0078972 A1* | 4/2003 | Tapissier et al. | 709/204 |
| 2004/0078596 A1* | 4/2004 | Kent et al. | 713/201 |
| 2004/0088325 A1* | 5/2004 | Elder et al. | 707/104.1 |
| 2005/0123106 A1* | 6/2005 | Gao et al. | 379/88.17 |
| 2005/0262151 A1 | 11/2005 | Plastina et al. | |
| 2006/0004699 A1 | 1/2006 | Lehikolnen et al. | |
| 2006/0004799 A1 | 1/2006 | Wallender | |
| 2006/0041929 A1* | 2/2006 | Della-Libera et al. | 726/1 |
| 2007/0208685 A1* | 9/2007 | Blumenau | 707/1 |

* cited by examiner

INTEGRATING PRIVATE METADATA INTO A COLLABORATIVE ENVIRONMENT

BACKGROUND OF THE INVENTION

Field of the Invention

The present invention relates to the field of collaborative computing and more particularly to private meta-data management in a collaborative computing environment.

Description of the Related Art

Collaborative computing refers to the use by two or more end users of a computing application in order to achieve a common goal. Initially envisioned as a document sharing technology among members of a small workgroup in the corporate environment, collaborative computing has grown today to include a wide variety of technologies arranged strategically to facilitate collaboration among groups as small as two people, or as large as a world-wide community. Thus, different collaborative applications may focus at groups of different sizes. No longer merely restricted to document sharing, the modern collaborative environment can include document libraries, chat rooms, video conferencing, application sharing, and discussion forums to name only a few.

A collaborative computing application enjoys substantial advantages over a more conventional, individualized computing application. Specifically, at present it is rare that a goal of any importance is entrusted and reliant upon a single person. In fact, many goals and objectives can be achieved only through the participation of a multiplicity of individuals, each serving a specified role or roles in the process. Consequently, to provide computing tools designed for use only by one of the individuals in the process can be short sighted and can ignore important potential contributions lying among the other individuals involved in the process.

Modern collaboration tools combine e-mail with other functions to integrate e-mail seamlessly into end user daily activities in an activity-centric collaboration tool. Activity-centric collaboration tools recognize that it is not enough to help people manage their e-mail, but to help people manage their work by associating communications and information feeds around a topic or activity. In an activity-centric collaboration tool, e-mail messages, synchronous communication such as instant messages, screen images, files, folders and to-do lists can be combined into an activity thread by a team allowing the team to switch easily between asynchronous and real-time collaboration.

In this regard, an activity thread might include the messages, chats and files exchanged among members of a team participating in a group project, collectively referred to as "activity objects". More specifically, an activity object such as a task description can be associated with meta-data, which can include for example one or more persons related to that activity, their respective roles such as "assigner" and "assignee," and various dates such as the date-of-assignment, the date-due, the date-actually-completed, comments to the activity, and so on. Notably, the meta-data can be shared meta-data in sense that all members associated with an activity object can access and utilize the meta-data.

On occasion, collaborators prefer to maintain activity object meta-data private from the view of other collaborators belonging to the activity object. Notwithstanding, conventional activity-centric collaborative tools do not distinguish between the private and shared nature of meta-data for an activity object. As such, it is not possible to restrict access to meta-data for an activity object. Consequently, collaborators are forced to maintain private-meta data for an activity separately from and externally to the activity-centric collaborative tool thereby defeating the unified interface of the activity-centric collaborative tool.

BRIEF SUMMARY OF THE INVENTION

Embodiments of the present invention address deficiencies of the art in respect to meta-data management for an activity thread in an activity-centric collaborative environment, and provide a novel and non-obvious method, system and computer program product for private metadata integration. In one embodiment of the invention, a private meta-data integration method can be provided for an activity-centric collaborative environment. The method can include selecting an activity thread for display to a collaborator in an activity map of the activity-centric collaborative environment, and identifying the collaborator. For meta-data instances associated with corresponding activity objects in the activity thread, the meta-data instances can be excluded that have been marked private by a creator other than the identified collaborator.

In another embodiment of the invention, a collaborative computing data processing system can be configured for activity-centric collaboration. The system can include an activity-centric collaboration tool configured for rendering an activity map of an activity thread of a plurality of activity objects to an identified collaborator communicatively coupled to the tool over a computer communications network. The system also can include a data store of meta-data for the activity objects. The data store can include a multiplicity of records, each of the records including a reference to a meta-data instance, a corresponding activity object instance in the activity thread, a privacy flag and an identification of a creator of the meta-data instance. Finally, private meta-data integration logic can be provided. The logic can include program code enabled to exclude meta-data instances from display in the activity thread that have been marked private by a creator other than the identified collaborator.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for private meta-data integration in an activity-centric collaboration environment. In accordance with an embodiment of the present invention, meta-data can be stored in association with different objects in an activity thread. The storage of the meta-data can include a flag indicating whether or not the meta-data is private. Additionally, the storage of the meta-data can include an indication of the creator of the meta-data. Thereafter, access control for the activity thread can inspect the flag and the creator for meta-data to differentiate treatment of the meta-data when rendering the meta-data in association with the activity thread.

Figure 1:
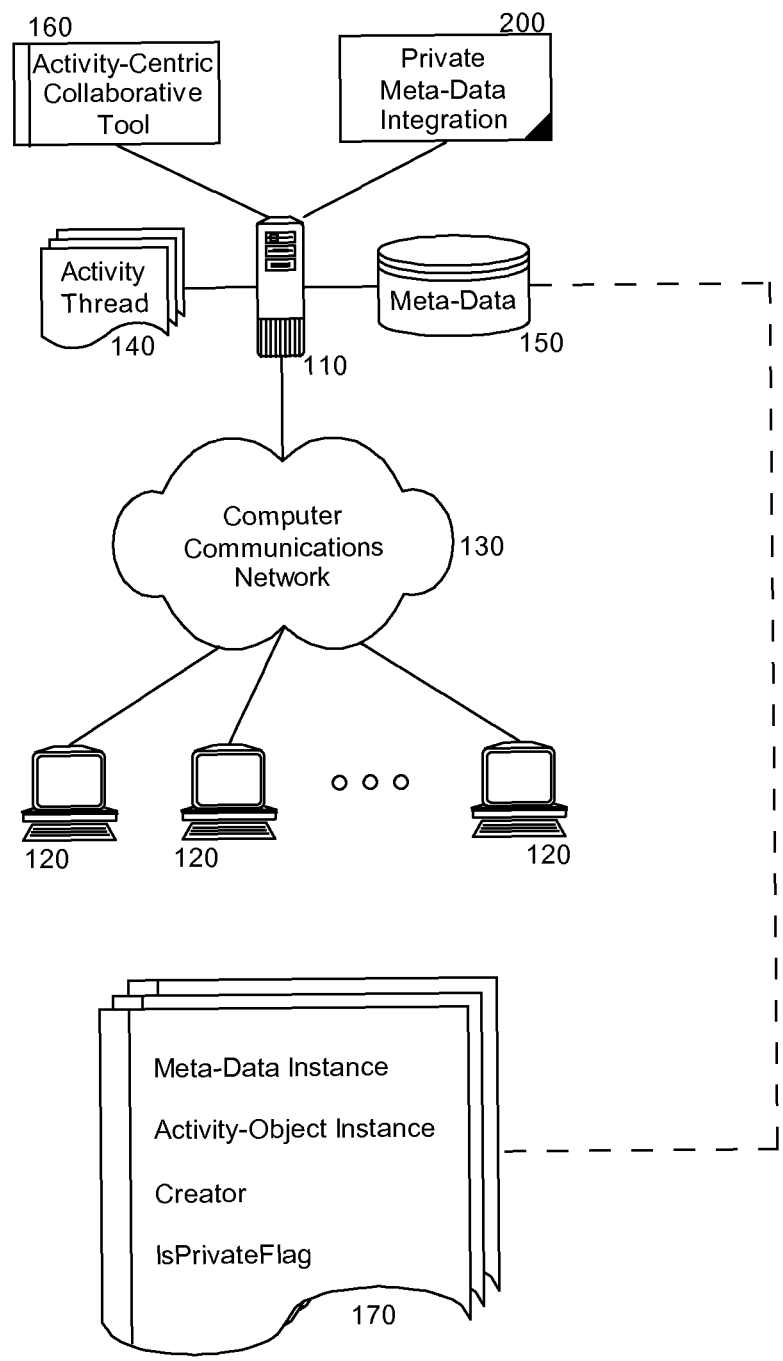
FIG. 1 is a schematic illustration of an activity-centric collaboration environment configured for private meta-data integration; and, FIG. 2 is a flow chart illustrating a process for private meta-data integration in an activity-centric collaboration environment.

In further illustration, FIG. 1 is a schematic illustration of an activity-centric collaboration environment configured for private meta-data integration. The activity-centric collaboration environment can include an activity-centric collaboration tool 160 supported in its operation by host computing platform 110 coupled to one or more collaborative clients 120 over computer communications network 130. The activity-centric collaboration tool 160 can be configured to support the presentation of an activity map of one or more activity threads 140. Each of the activity threads 140 can include a hierarchy of nodes, each node including an activity-object as it is well-known in the art. To that end, the activity centric collaboration tool 160 can include the Activity Explorer™ included as part of the Lotus Workplace™ offering manufactured by IBM Corporation of Armonk, N.Y., United States.

As shown in FIG. 1, meta-data can be stored in association with different activity objects in the activity threads 140. The meta-data can include, for instance, comments associated with a corresponding node in one of the activity threads 140, an activity object in a node, a property of an activity object in a node, or tags applied to a corresponding activity object in a node. Notably, the meta-data can be shared, or the meta-data can be private. In this regard, the meta-data can be stored in a data store 150 of meta-data. The data store 150 of meta-data can include records 170 for meta-data associated with a corresponding activity object. Each of the records 170 can specify a meta-data instance, a corresponding activity object instance, an identity the collaborator creating the meta-data, and a flag indicating whether the meta-data is shared or private.

Importantly, private meta-data integration logic 200 can be coupled to the activity-centric collaborative tool 160. The private meta-data integration logic 200 can include program code enabled to exclude a display of meta-data for an activity object in an activity thread 140 in an activity map when the meta-data has been marked private and where the creator of the private meta-data differs from the collaborator attempting to view the activity thread 140. To that end, the program code of the private meta-data integration logic 200 can inspect the records 170 for meta-data corresponding to activity objects in the activity thread 140 to ensure that only shared meta-data and private meta-data created by the viewing collaborator will be rendered in the activity thread 140 for viewing.

Figure 2:
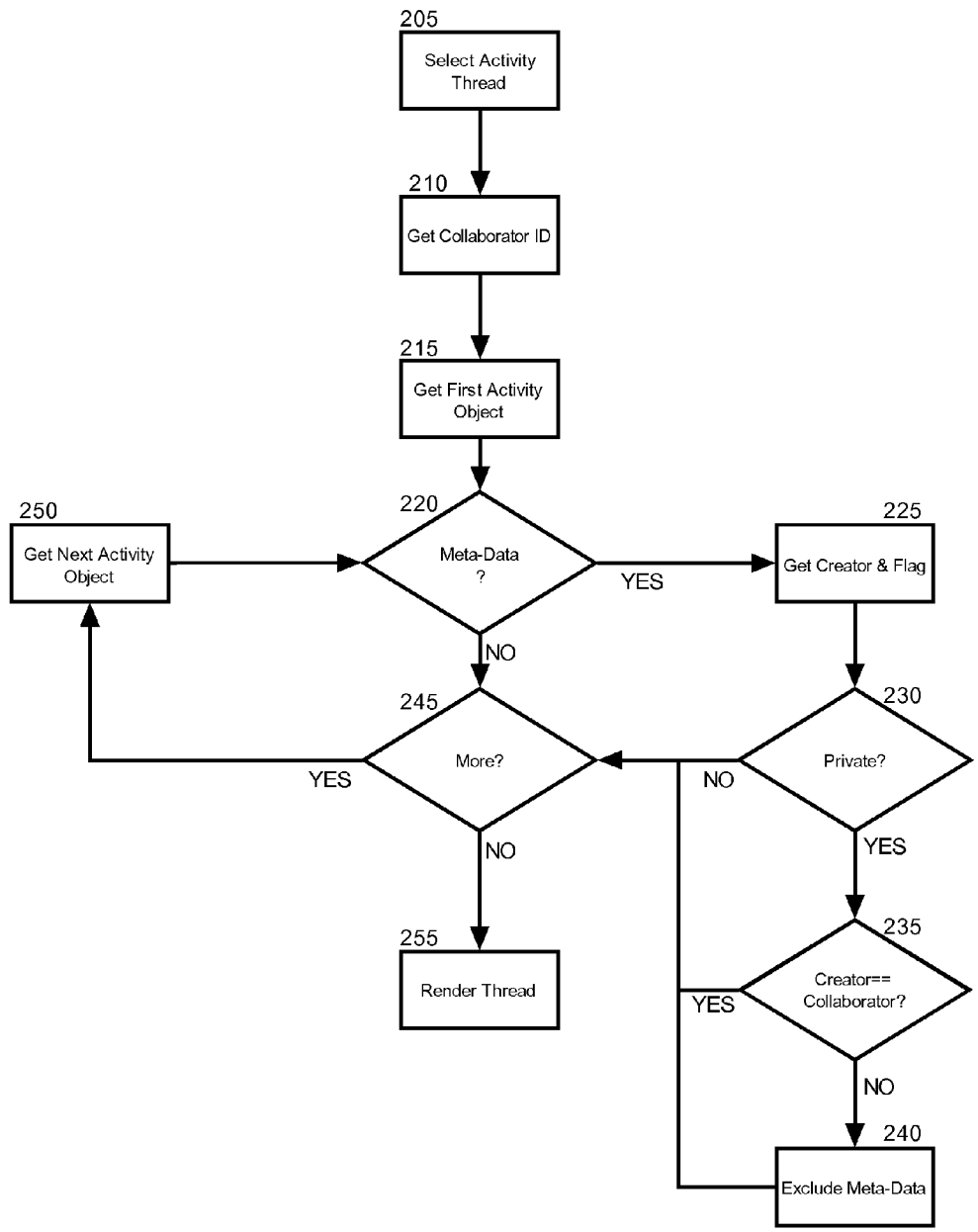

In yet further illustration, FIG. 2 is a flow chart illustrating a process for private meta-data integration in an activity-centric collaboration environment. Beginning in block 205, an activity thread can be selected for display in an activity map. In block 210, an identity of a collaborator seeking to view the activity thread can be determined and in block 215, a first activity object in the activity thread can be selected for processing. In decision block 220, it can be determined whether meta-data has been associated with the selected activity object. If so, in block 225, the creator of the meta-data and a flag indicating privacy can be retrieved for the meta-data.

In decision block 230, if the meta-data has been marked private, in decision block 235, it further can be determined whether the creator of the meta-data is the same as the identified collaborator. If not, the meta-data can be excluded for inclusion in a view to the activity thread. Thereafter, in decision block 245, it can be determined whether additional activity objects in the activity thread remain to be processed. If so, in block 250 a next activity object in the activity thread can be retrieved for processing and the flow can continue through decision block 220 once again. In decision block 245, when no more activity objects in the activity thread remain to be processed, in block 255 the activity thread can be rendered for viewing by the identified collaborator.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A private meta-data integration method for an activity-centric collaborative environment, the method comprising:
   generating in an activity centric collaborative environment, a multiplicity of activity threads, each comprising a multiplicity of activity objects each comprising each of messages, chats and files exchanged among members of a team collaborating in a group project;

associating each of the activity objects of the threads with corresponding meta-data indicating a creator, and further associating a subset of the corresponding meta-data with a privacy flag;

selecting one of the activity threads on behalf of a particular member collaborating in a corresponding group project for the selected one of the activity threads;

displaying the selected one of the activity threads in an activity map of the activity-centric collaborative environment for viewing by the particular member; and, for each object in the selected one of the activity threads, loading corresponding meta-data and displaying the loaded meta-data in the activity map unless the corresponding meta-data is associated with a privacy flag and on condition that the corresponding meta-data is associated with a privacy flag and the particular member is identified as being the same as a creator of of corresponding object, displaying the loaded meta-data in the activity map, but otherwise on condition that the corresponding meta-data is associated with a privacy flag and the particular member is identified as being different than the creator of the corresponding object, not displaying the corresponding meta-data.

2. The method of claim 1, wherein the meta-data indicates a due date for a corresponding one of the objects.

3. The method of claim 1, wherein the meta-data indicates a task description for a corresponding one of the objects.

4. The method of claim 1, wherein the meta-data indicates a list of related members for a corresponding one of the objects.

5. The method of claim 4, wherein the meta-data indicates which of the related members have been assigned the corresponding one of the objects.

6. The method of claim 5, wherein the meta-data indicates which of the related members has assigned the corresponding one of the objects to an assigned one of the related members.

7. The method of claim 1, wherein the meta-data indicates a date of completion of a corresponding one of the objects.

8. The method of claim 1, wherein the meta-data indicates a date of assignment of a corresponding one of the objects.

9. A collaborative computing data processing system configured for activity-centric collaboration, the system comprising:

an activity-centric collaboration tool configured for rendering an activity map of a multiplicity of activity threads, each comprising a multiplicity of activity objects each comprising each of messages, chats and files exchanged among members of a team collaborating in a group project;

a data store of meta-data for the activity objects in each of the activity threads, the data store comprising a plurality of records, each of the records comprising a reference to meta-data and a corresponding one of the activity objects for a corresponding one of the activity threads; and, private meta-data integration logic comprising program code enabled to:

associate a subset of the meta-data in the data store with a privacy flag;

select one of the activity threads on behalf of a particular member collaborating in a corresponding group project for the selected one of the activity threads;

display the selected one of the activity threads in the activity map for viewing by the particular member; and, for each object in the selected one of the activity threads, load corresponding meta-data and display the loaded meta-data in the activity map unless the corresponding meta-data is associated with a privacy flag and on condition that the corresponding meta-data is associated with a privacy flag and the particular member is identified as being the same as a creator of of corresponding object, display the loaded meta-data in the activity map, but otherwise on condition that the corresponding meta-data is associated with a privacy flag and the particular member is identified as being different than the creator of the corresponding object, not display the corresponding meta-data.

10. A computer program product comprising a computer for private meta-data integration for an activity-centric collaborative environment, the computer program product comprising a non-transitory computer readable storage medium having program instructions embodied therewith, wherein the computer readable storage medium is not a transitory signal per se, the program instructions executable by a device to cause the device to perform a method comprising:

generating in an activity centric collaborative environment, a multiplicity of activity threads, each comprising a multiplicity of activity objects each comprising each of messages, chats and files exchanged among members of a team collaborating in a group project;

associating each of the activity objects of the threads with corresponding meta-data indicating a creator, and further associating a subset of the corresponding meta-data with a privacy flag;

selecting one of the activity threads on behalf of a particular member collaborating in a corresponding group project for the selected one of the activity threads;

displaying the selected one of the activity threads in an activity map of the activity-centric collaborative environment for viewing by the particular member; and, for each object in the selected one of the activity threads, loading corresponding meta-data and displaying the loaded meta-data in the activity map unless the corresponding meta-data is associated with a privacy flag and on condition that the corresponding meta-data is associated with a privacy flag and the particular member is identified as being the same as a creator of of corresponding object, displaying the loaded meta-data in the activity map, but otherwise on condition that the corresponding meta-data is associated with a privacy flag and the particular member is identified as being different than the creator of the corresponding object, not displaying the corresponding meta-data.

11. The computer program product of claim 10, wherein the meta-data indicates a due date for a corresponding one of the objects.

12. The computer program product of claim 10, wherein the meta-data indicates a task description for a corresponding one of the objects.

13. The computer program product of claim 10, wherein the meta-data indicates a list of related members for a corresponding one of the objects.

14. The computer program product of claim 13, wherein the meta-data indicates which of the related members have been assigned the corresponding one of the objects.

15. The computer program product of claim 14, wherein the meta-data indicates which of the related members has assigned the corresponding one of the objects to an assigned one of the related members.

16. The computer program product of claim 10, wherein the meta-data indicates a date of completion of a corresponding one of the objects.

17. The method of claim 10, wherein the meta-data indicates a date of assignment of a corresponding one of the objects.

* * * * *